(12) United States Patent
Lee

(10) Patent No.: US 7,463,314 B2
(45) Date of Patent: Dec. 9, 2008

(54) FLAT PANEL DISPLAY DEVICE

(75) Inventor: Sang-Duk Lee, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 83 days.

(21) Appl. No.: 11/232,166

(22) Filed: Sep. 20, 2005

(65) Prior Publication Data

US 2006/0072050 A1 Apr. 6, 2006

Related U.S. Application Data

(63) Continuation of application No. 10/429,081, filed on May 2, 2003, now Pat. No. 6,975,368.

(30) Foreign Application Priority Data

Dec. 4, 2002 (KR) ............................... 2002-76646

(51) Int. Cl.
*G02F 1/1333* (2006.01)
(52) U.S. Cl. ......................................................... 349/58
(58) Field of Classification Search ............. 349/58–60; 403/70, 71; 24/457–458, 543, 548, 546
See application file for complete search history.

(56) References Cited

U.S. PATENT DOCUMENTS 5,363,227 A 11/1994 Ichikawa et al.

5,409,499 A 4/1995 Yi (Continued)

FOREIGN PATENT DOCUMENTS

JP 2000-004087 1/2000

OTHER PUBLICATIONS

Taiwanese Office Action corresponding to Taiwanese Patent Application No. 096203676 10, Jul. 5, 2007, English Translation of Official Letter and Search Report of corresponding R.O.C. patent application No. 092112313, 10 pages.

(Continued)

*Primary Examiner*—David C. Nelms
*Assistant Examiner*—Phu Vu
(74) *Attorney, Agent, or Firm*—MacPherson Kwok Chen & Heid LLP

(57) ABSTRACT

In a flat panel display device, the display device includes a display panel to display an image, a receiving receptacle and a guiding member. The receiving receptacle has a bottom surface and a first sidewall. The guiding member has a first coupling portion that is positioned higher than the first sidewall and a guiding portion that is positioned higher than the first coupling portion to guide the display panel disposed on the first sidewall. The first coupling portion of the guiding member is disposed between the display panel and the first sidewall of the receiving receptacle, and the guiding portion of the guiding member prevents movement of the display panel.

10 Claims, 13 Drawing Sheets

U.S. PATENT DOCUMENTS

| | | |
|---|---|---|
| 5,838,400 A | 11/1998 | Ueda et al. |
| 6,049,975 A | 4/2000 | Clayton |
| 6,155,844 A | 12/2000 | Semmeling et al. |
| 6,175,392 B1 | 1/2001 | Kim et al. |
| 6,343,409 B1 | 2/2002 | McAllister |
| 6,522,371 B1 * | 2/2003 | Sakamoto et al. ............. 349/58 |
| 6,559,907 B1 | 5/2003 | Byoun |
| 6,721,021 B2 * | 4/2004 | Sakamoto et al. ............. 349/58 |
| 6,975,368 B2 * | 12/2005 | Lee ............................. 349/58 |

OTHER PUBLICATIONS

KIPO Office Action corresponding to Korean patent Application No. 2002-76646, Jul. 10, 2007, 4 pages.

* cited by examiner

US 7,463,314 B2

FLAT PANEL DISPLAY DEVICE

CROSS-REFERENCE TO RELATED APPLICATION

This application is a Continuation of U.S. patent application Ser. No. 10/429,081 filed on May 2, 2003, now U.S. Pat. No. 6,975,368 which relies for priority upon Korean Patent Application No. 2002-76646 filed on Dec. 4, 2002. The contents of both applications are herein incorporated by reference in their entirety.

BACKGROUND OF THE INVENTION

1. Field of the Invention

The present invention relates to an FPD (Flat Panel Display) device, and more particularly to an FPD device having a reduced size and an enhanced assemblability.

2. Description of the Related Art

An LCD apparatus changes an arrangement of liquid crystal molecules into a specific arrangement by applying a voltage to the liquid crystal molecules. The LCD apparatus converts variations in optical properties, for example, such as birefringence, optical linearity, dichroism and light scattering features of liquid crystal cells, which emit light due to the specific arrangement, into variations in visual properties, thereby displaying an image.

An LCD apparatus has been gradually scaled up in accordance with demand of customers, so that the scaling-up of the LCD apparatus has accommodated an LCD panel and a mold frame for receiving the LCD panel to be scaled up to the demand of the customers.

A mold frame, generally, includes a bottom surface and a sidewall extended from the bottom surface and the sidewall is formed with a stepped portion on which an LCD panel is disposed. The LCD panel disposed on the stepped portion is supported by the sidewall of the mold frame, thereby preventing the movement of the LCD panel.

Recently, however, the thickness of a sidewall of a mold frame, which supports an LCD panel disposed thereon, is gradually thinned in order to reduce an entire size of an LCD apparatus scaled up in accordance with a scaling-up of an LCD panel.

As a result, the thinned mold frame cannot provide strength suitable for receiving and supporting the scaled-up LCD panel. Thus, the LCD panel can be easily moved by an impact from an exterior, so the LCD panel can be damaged.

BRIEF SUMMARY OF THE INVENTION

The present invention provides an FPD device having a reduced size and an enhanced assemblability.

In one aspect of the invention, an FPD device includes a display panel to display an image, a receiving receptacle and a guiding member. The receiving receptacle has a bottom surface and a first sidewall. The guiding member has a first coupling portion that is positioned higher than the first sidewall and a guiding portion that is positioned higher than the first coupling portion to guide the display panel disposed on the first sidewall. The first coupling portion of the guiding member is disposed between the display panel and the first sidewall of the receiving receptacle, and the guiding portion of the guiding member prevents movement of the display panel Accordingly, since the first receptacle employs the metal clip so as to support and guide the display panel disposed on the first receptacle, the first receptacle can reduce a thickness of the first sidewall thereof, thereby reducing an entire size of the flat panel display device.

Also, the FPD device can have an enhanced assemblability because of employing the metal clip having strength stronger than that of the first receptacle.

BRIEF DESCRIPTION OF THE DRAWINGS

The above and other advantages of the present invention will become readily apparent by reference to the following detailed description when considered in conjunction with the accompanying drawings wherein.

DETAILED DESCRIPTION OF THE INVENTION

Figure 1:
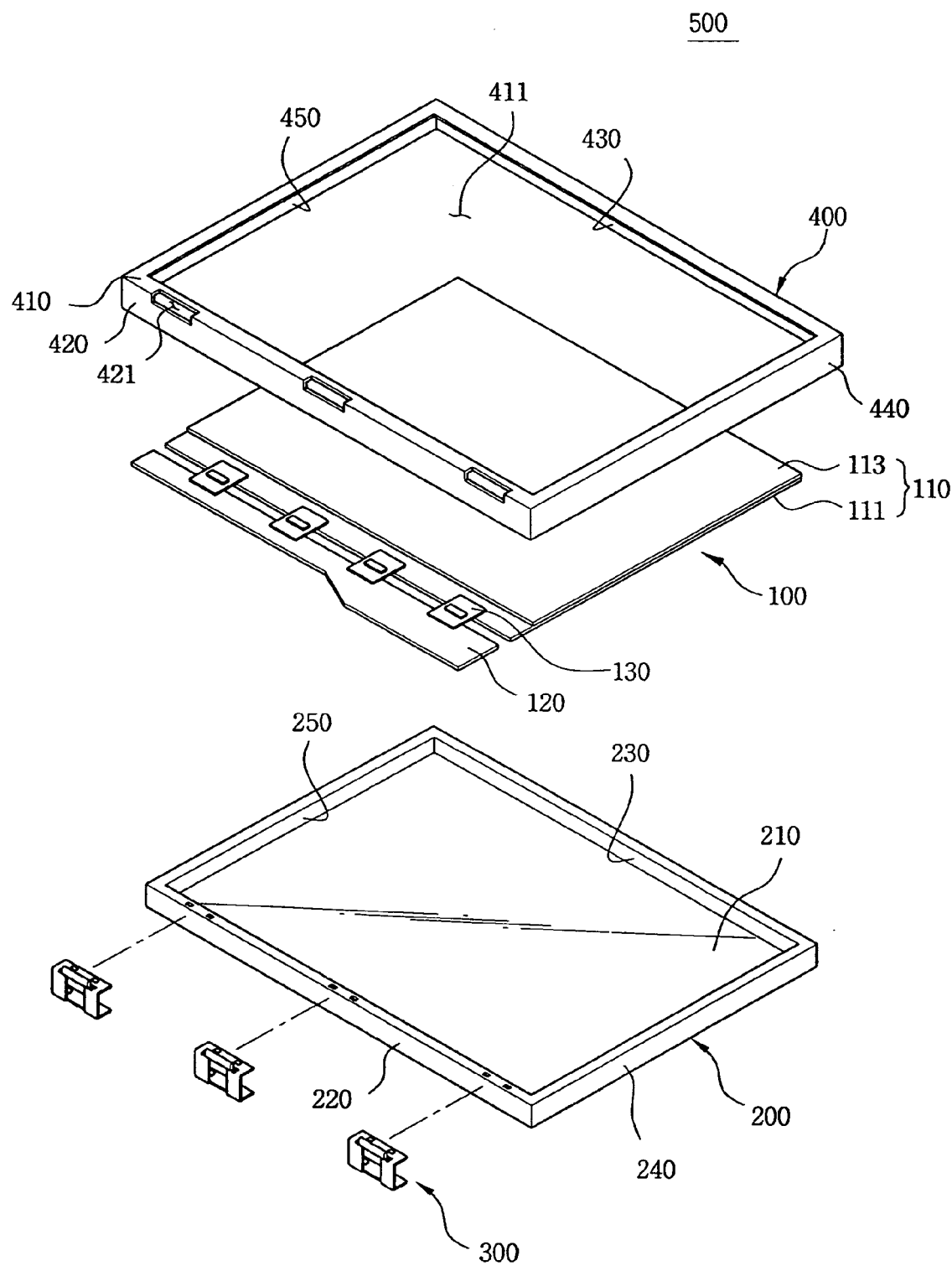
FIG. 1 is an exploded perspective view showing an LCD apparatus according to an exemplary embodiment of the present invention.

FIG. 1 is an exploded perspective view showing an LCD apparatus according to an exemplary embodiment of the present invention.

Referring to FIG. 1, an LCD apparatus 500 includes a display unit 100 for displaying an image, a mold frame 200 for receiving the display unit 100, a plurality of metal clips 300 coupled to the mold frame 200 so as to support the display unit 100 and a top chassis 400 coupled to the mold frame 200 so as to cover the display unit 100.

The display unit 100 includes an LCD panel 110 having a first substrate 111, a second substrate 113 facing the first substrate 111 and a liquid crystal layer (not shown) interposed between the first and second substrates 111 and 113, a plurality of TCPs (Tape Carrier Package) 130 connected to the LCD panel 110 and a printed circuit board 120.

The first substrate 111 includes a plurality of pixels formed on the first substrate 111 in a matrix configuration. Each of the pixels includes a data line (not shown) extended in a first direction, a gate line (not shown) extended in a second direction perpendicular to the first direction, a TFT (Thin Film Transistor) (not shown) connected between the data and gate lines and a pixel electrode (not shown) connected to the TFT.

The second substrate 113 includes a color filter (not shown) having RGB pixels corresponding to the plurality of pixels, respectively and a common electrode (not shown) that is disposed on the color filter and faces the pixel electrode.

The first substrate 111 is combined with the second substrate 113 and the liquid crystal layer is interposed between the first and second substrates 111 and 113.

The printed circuit board 120 generates a driving signal for driving the LCD panel 110 in response to signals applied from an exterior. The printed circuit board 120 is electrically connected to the LCD panel 110 through the plurality of TCPs 130.

Particularly, the TCPs 130 are attached to a data area of the first substrate 111 where an end of the data line is positioned and spaced apart from each other so as to apply the driving signal to the data line.

In FIG. 1, an integrated printed circuit board for generating signals provided to the data and gate lines has been described. However, the printed circuit board 120 may be separately applied to the data area and a gate area of the first substrate 111 on which the gate line is positioned.

The mold frame 200 includes a bottom surface 210 and first to fourth sidewalls 220, 230, 240 and 250 extended from the bottom surface 210. The LCD 20 panel 110 is disposed on an upper portion of the first to fourth sidewalls 220, 230, 230 and 250.

Although not shown in FIG. 1, the mold frame 200 receives a backlight assembly at a receiving space defined by means of the bottom surface 210 and first to fourth sidewalls 220, 230, 240 and 250. That is, the backlight assembly is disposed under the LCD panel 110 so as to provide the light to the LCD panel 110.

The metal clips 300 are coupled to the first sidewall 220 of the mold frame 200 and positioned at a position higher than the first sidewall 220 so as to guide the LCD panel 110 disposed on the mold frame 200 and prevent a movement of the LCD panel 110. Also, the metal clips 300 are located at areas of the first sidewall 220, which are not corresponding to the TCPs 130.

In this exemplary embodiment of the present invention, since the metal clips 300 have structure identical to each other, a structure and a coupling structure of one of the metal clips 300 will be described in detail.

The LCD panel 110 includes a display area on which an image is displayed and a peripheral area adjacent to the display area. The top chassis 400 includes an upper surface 410 formed with an opening 411 for exposing the display area of the LCD panel 110 and fifth to eighth sidewalls 420, 430, 440 and 450 extended from the upper surface 410. The top chassis 400 is combined with the mold frame 200. The upper surface 410 of the top chassis 400 is disposed corresponding to the peripheral area and the fifth to eighth sidewalls 420, 430, 440 and 450 are combined 15 with the first to fourth sidewalls 220, 230, 240 and 250, respectively, so the peripheral area of the LCD panel 110 is covered by the upper surface 410 of the top chassis 400.

Figure 2:
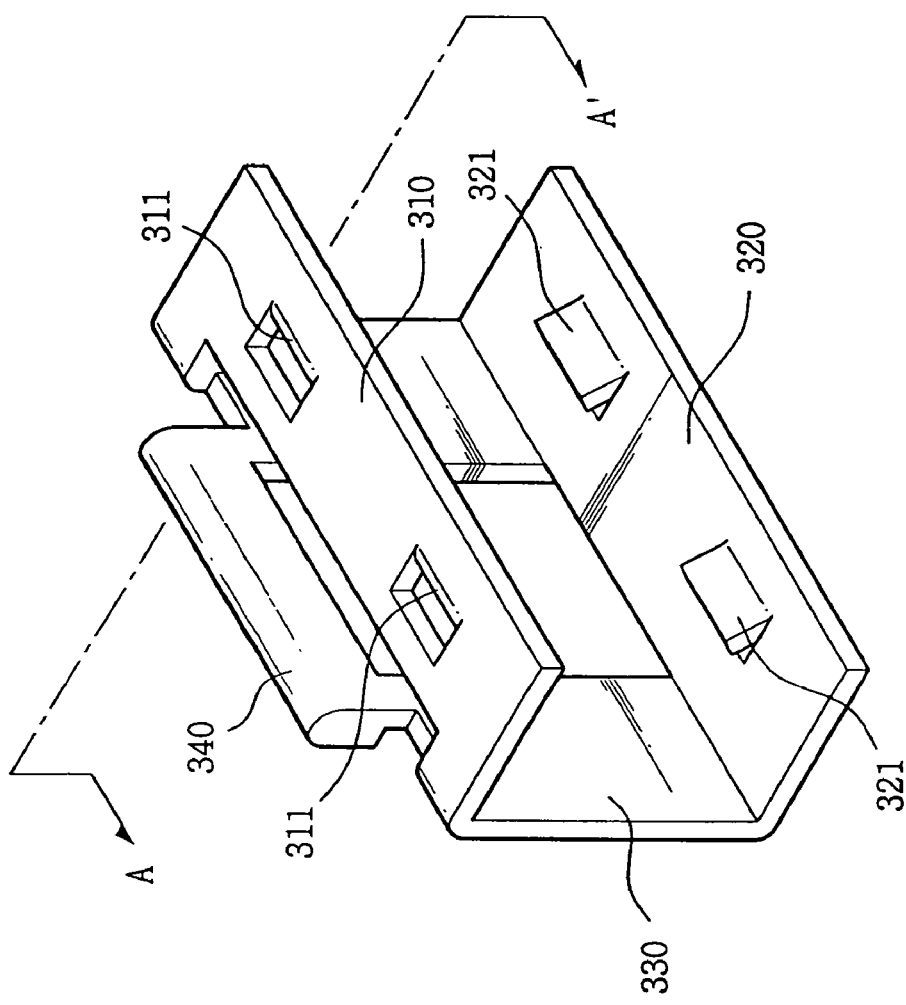
FIG. 2 is a perspective view showing a metal clip shown in FIG. 1.
Figure 3:
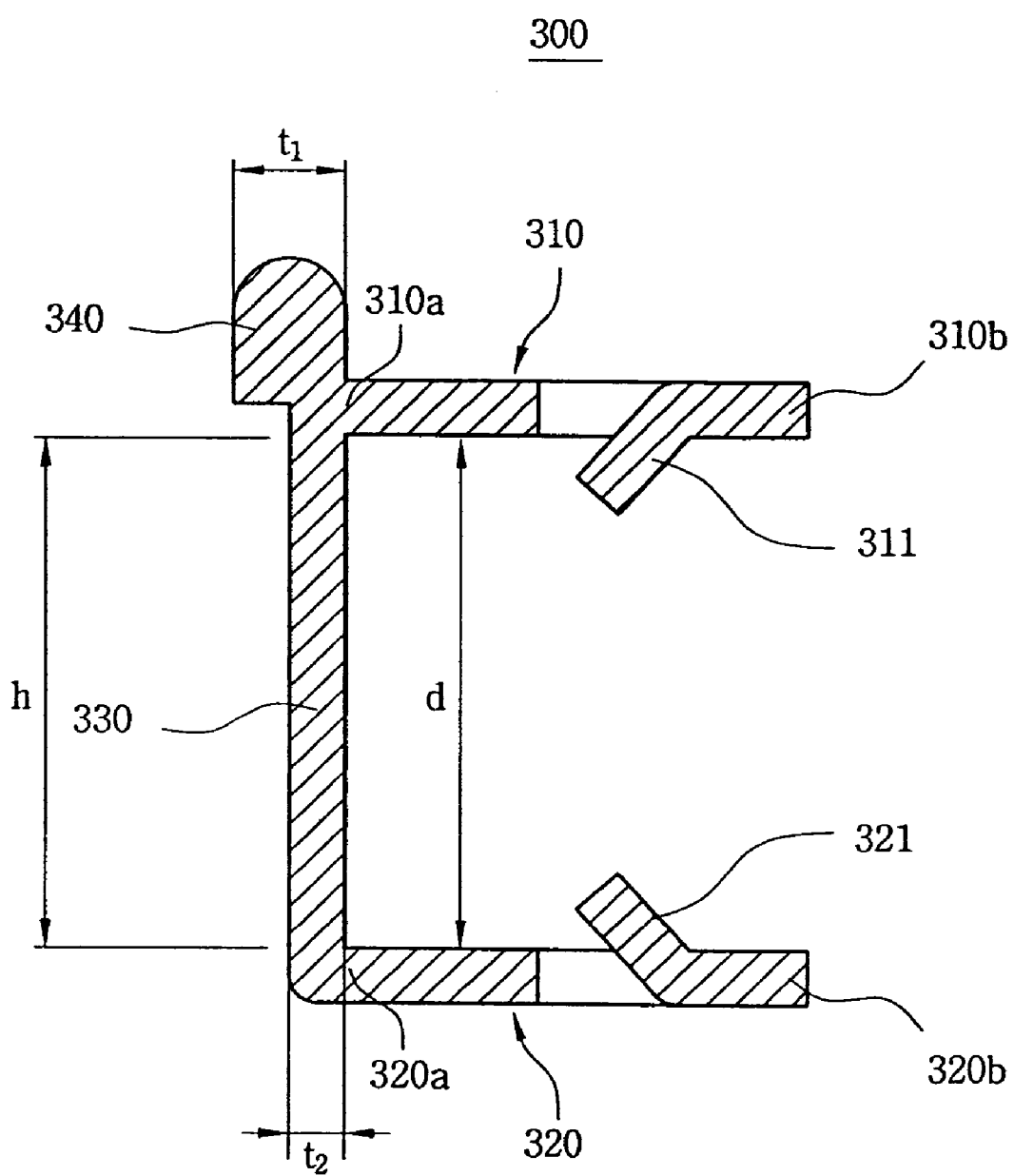
FIG. 3 is a cross-sectional view taken along the lines A-A' for showing a metal clip shown in FIG. 2.

FIG. 2 is a perspective view showing a metal clip shown in FIG. 1, and FIG. 3 is a cross-sectional view taken along the lines A-A for showing a metal clip shown in FIG. 2.

Referring to FIGS. 2 and 3, the metal clip 300 includes a first coupling portion 310, a second coupling portion 320 facing the first coupling portion 310, a connecting portion 330 for connecting the first coupling portion 310 and the second coupling portion 320 and a guiding portion 340 upwardly extended from the connecting portion 330 so as to guide the LCD panel 110 (see FIG. 1).

The first coupling portion 310 is spaced apart from the second coupling portion 320 in a predetermined distance. The connecting portion 330 connects a first end 310a of the first coupling portion 310 and a second end 320a of the second coupling portion 320. A linear distance (d) between the first and second coupling portions 310 and 320 is identical to a height (h) of the connecting portion 330 because the first coupling portion 310 is parallel to the second coupling portion 320.

The first coupling portion 310 includes a first protrusion 311 inwardly protruded from the first coupling portion 310 and the second coupling portion 320 includes a second protrusion 321 inwardly protruded from the second coupling portion 320.

The first protrusion 311 has a rectangular shape. The first protrusion 311 includes an end positioned adjacent to a third end 310b opposite to the first end 310a of the first coupling portion 310 and integrally formed with the first coupling portion 310 and remaining ends cut away from the first coupling portion 310 and inwardly protruded toward a space between the first and second coupling portions 310 and 320.

The second protrusion 321 has a rectangular shape. The second protrusion 321 includes an end positioned adjacent to a fourth end 320b opposite to the second end 320a of the second coupling portion 320 and integrally formed with the second coupling portion 320 and remaining ends cut away from the second coupling portion 320 and inwardly protruded toward a space between the first and second coupling portions 310 and 320.

The guiding portion 340 is upwardly extended from the connecting portion 330 and has a round shape at an upper portion thereof. The guiding portion 340 has a first thickness t1 thicker than a second thickness t2 of the connecting portion 330.

Hereinafter, a coupling structure of the metal clip 300, mold frame 200, LCD panel 110 and top chassis 400 will be described in detail with reference to accompanying drawings.

Figure 4:
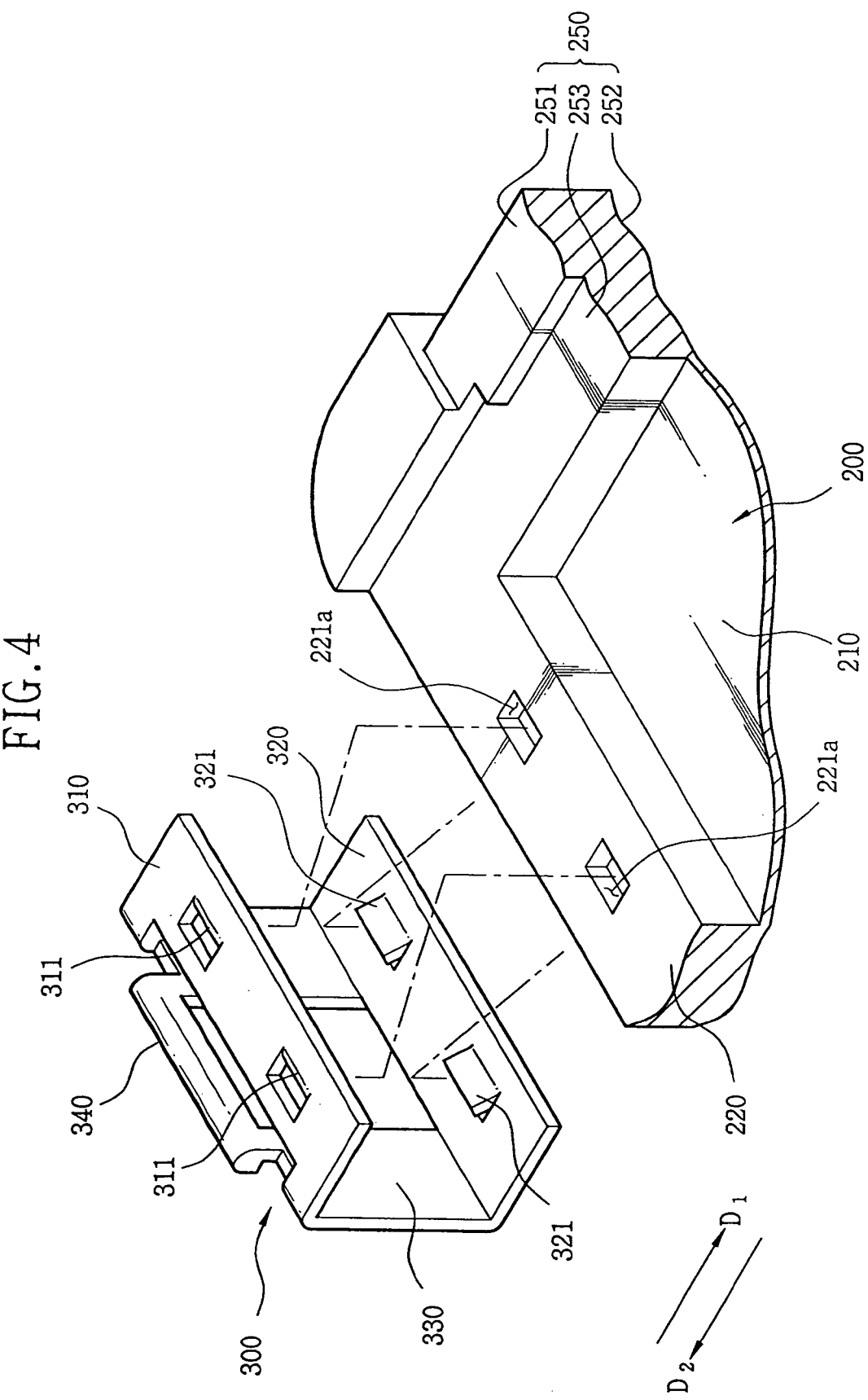
FIG. 4 is a perspective view showing structure of a mold frame and a metal clip shown in FIG. 1.
Figure 5:
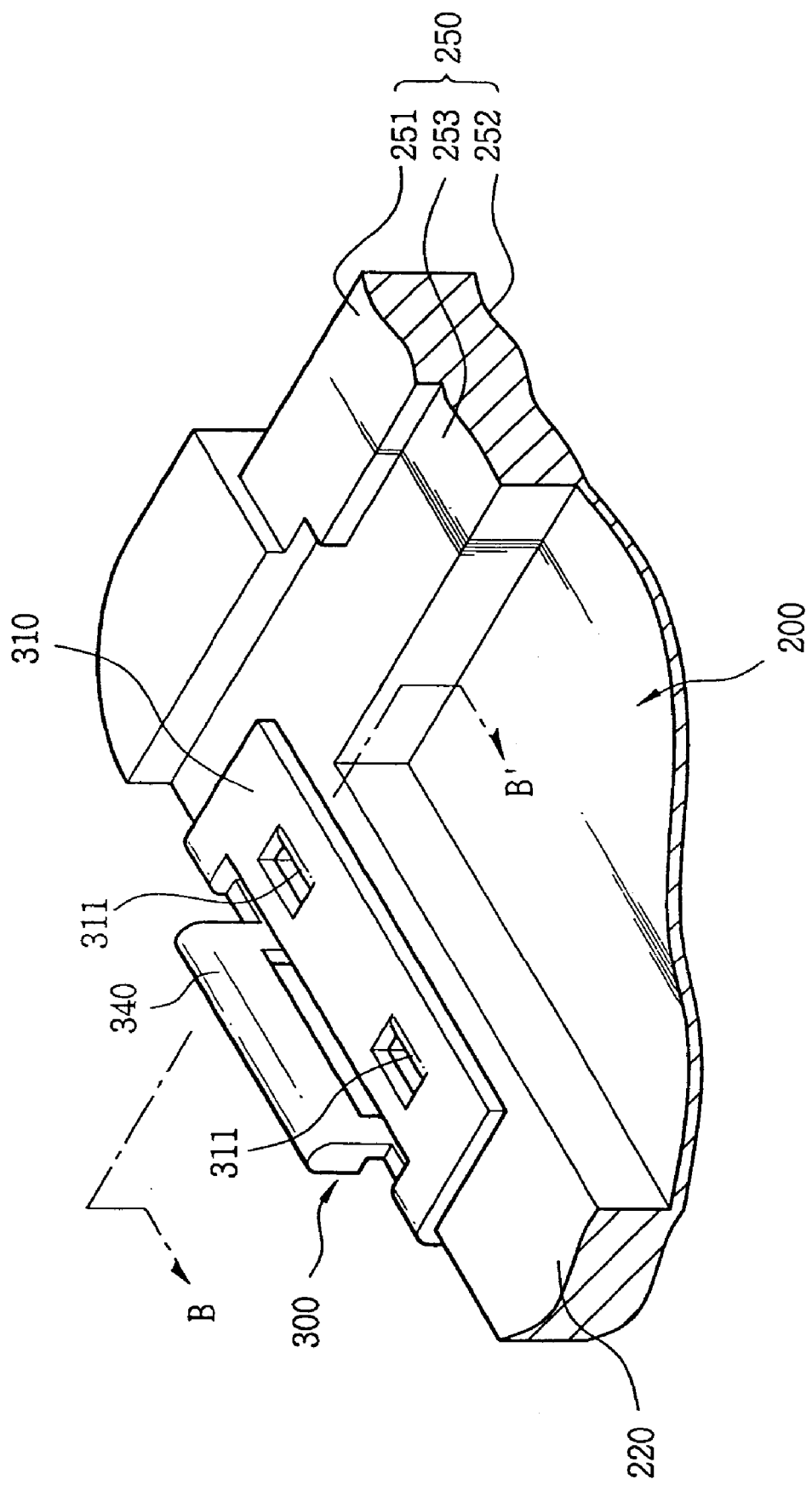
FIG. 5 is a perspective view showing a metal clip assembled into a mold frame shown in FIG. 1.
Figure 6:
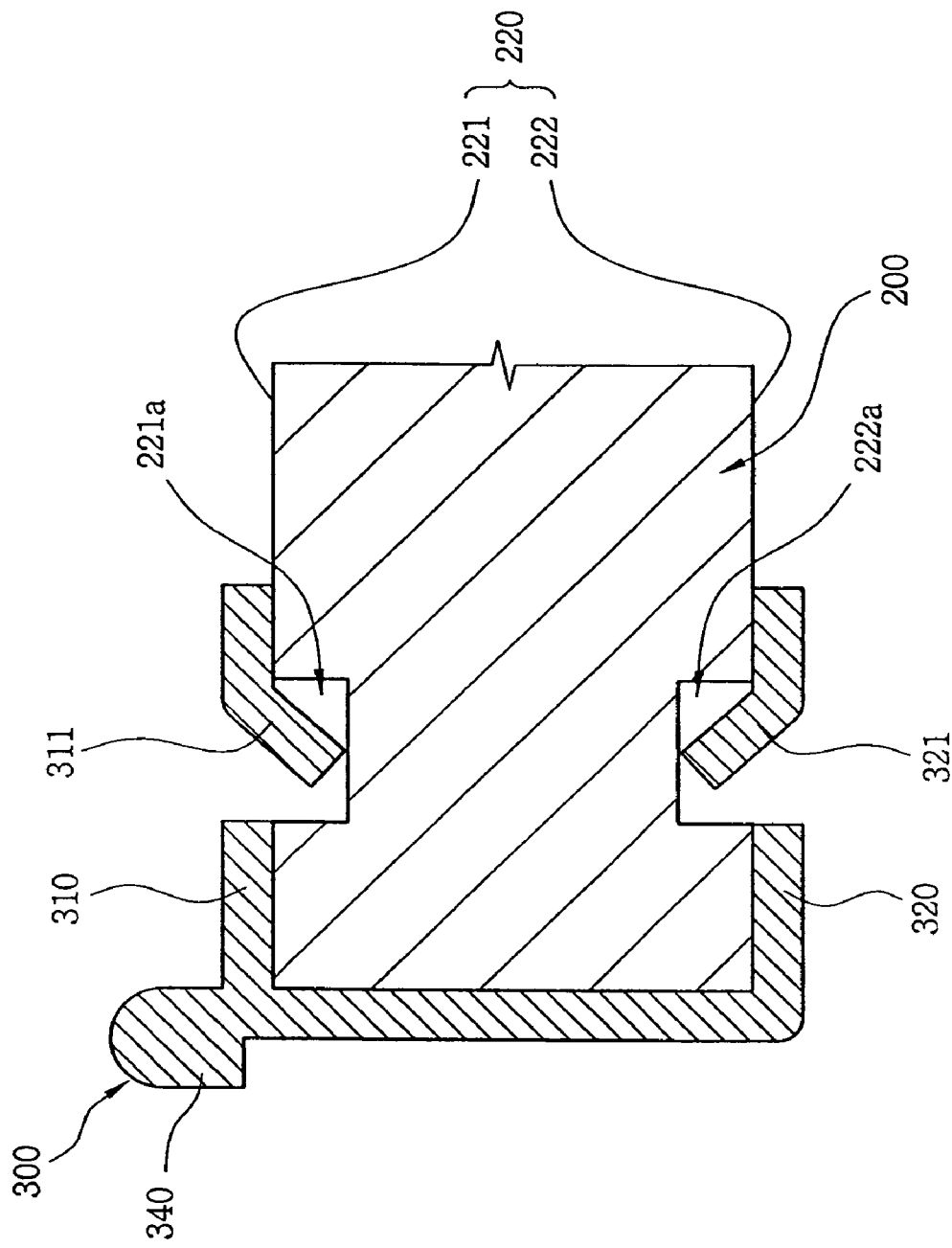
FIG. 6 is a cross-sectional view taken along the lines B-B' for showing an assembled structure of a metal clip and a mold frame shown in FIG. 5.

FIG. 4 is a perspective view showing structure of a mold frame and a metal clip shown in FIG. 1, FIG. 5 is a perspective view showing a metal clip assembled into a mold frame shown in FIG. 1, and FIG. 6 is a cross-sectional view taken along the lines B-B' for showing an assembled structure of a metal clip and a mold frame shown in FIG. 5.

Referring to FIGS. 4 to 6, the metal clip 300 is coupled to a first sidewall 220 of the mold frame 200. Particularly, the metal clip 300 includes the first coupling portion 310 disposed on an upper surface 221 of the first sidewall 220 and the second coupling portion 320 disposed on a lower surface 222 of the first sidewall 220. The metal clip 300 includes the connecting portion 330 that connects the first end 310a of the first coupling portion 310 and the second end 320a of the second coupling portion 320, and the guiding portion 340 upwardly extended from the connecting portion 330.

The first and second coupling portions 310 and 320 are parallel to each other and the linear distance (d) between the first and second coupling portions 310 and 320 is identical to the height (h) of the connecting portion 330. The first coupling portion 310 is provided with the first protrusion 311 inwardly protruded from the first coupling portion 310, and the second coupling portion 320 is provided with the second protrusion 321 inwardly protruded from the second coupling portion 320.

The first sidewall 220 is provided with a first fixing recess 221a formed on the upper surface 221 thereof and a second fixing recess 222a formed on the lower surface 222 thereof. When the metal clip 300 is coupled to the first sidewall 220, the first protrusion 311 of the first coupling portion 310 is inserted into the first fixing recess 221a and the second protrusion 321 is inserted into the second fixing recess 222a, thereby fixing the metal clip 300 to the first sidewall 220 of the mold frame 200.

The first protrusion 311 is inwardly protruded from the first coupling portion 310 to a second direction D2 and inclined at a predetermined angle, which is opposite to a first direction D1 that the metal clip 300 is coupled to the first sidewall 220. Therefore, the first protrusion 311 is moved along the upper surface 221 of the first sidewall 220 while the metal clip 300 is coupled to the first sidewall 220. When the metal clip 300 is completely coupled to the first sidewall 220, the first protrusion 311 is inserted into the first fixing recess 221a as shown in FIG. 6.

The second protrusion 321 is also inwardly protruded from the second coupling portion 310 to the second direction D2 and inclined at a predetermined angle, which is opposite to the first direction D1 that the metal clip 300 is coupled to the first sidewall 220. Therefore, the second protrusion 321 is moved along the lower surface 222 of the first sidewall 220 while the metal clip 300 is coupled to the first sidewall 220. When the metal clip 300 is completely coupled to the first sidewall 220, the second protrusion 321 is inserted into the second fixing recess 222a as shown in FIG. 6.

The guiding portion 340 upwardly extended from the connecting portion 330 is positioned at the position higher than the first coupling portion 310. Preferably, a height of the guiding portion 340 is substantially identical to a thickness of the LCD panel 110. That is, when the height of the guiding portion 340 is smaller than the thickness of the LCD panel 110, the guiding portion 340 cannot support the LCD panel 110 disposed on the mold frame 200 and when the height of the guiding portion 340 is greater than the thickness of the LCD panel 110, an entire thickness of the LCD apparatus 500 increases due to the guiding portion 340 of the metal clip 300.

Accordingly, when the guiding portion 340 is formed to have a height substantially identical to the thickness of the LCD panel 110, the guiding portion 340 can support the LCD panel 110 and prevent the increase in the thickness of the LCD apparatus 500.

The guiding portion 340 has the round shape at the upper portion thereof so as to improve an assemblability of the LCD apparatus 500. In order to improve strength of the guiding portion 340 that supports the LCD panel 110, the guiding portion 340 may have the thickness t1 thicker than the second thickness t2 of the connecting portion 330.

Figure 7:
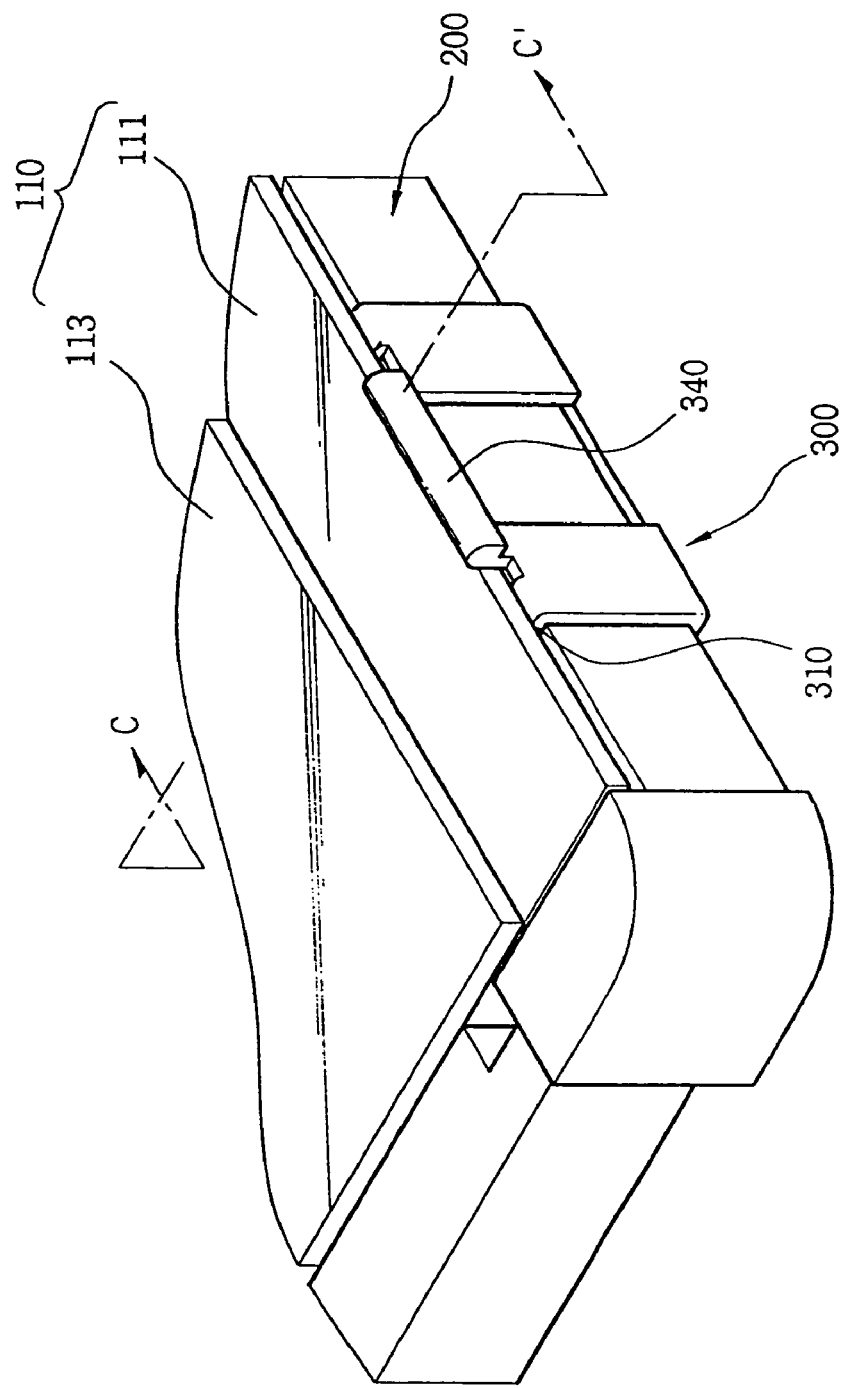
FIG. 7 is a perspective view showing a metal clip, a mold frame and an LCD panel shown in FIG. 1.
Figure 8:
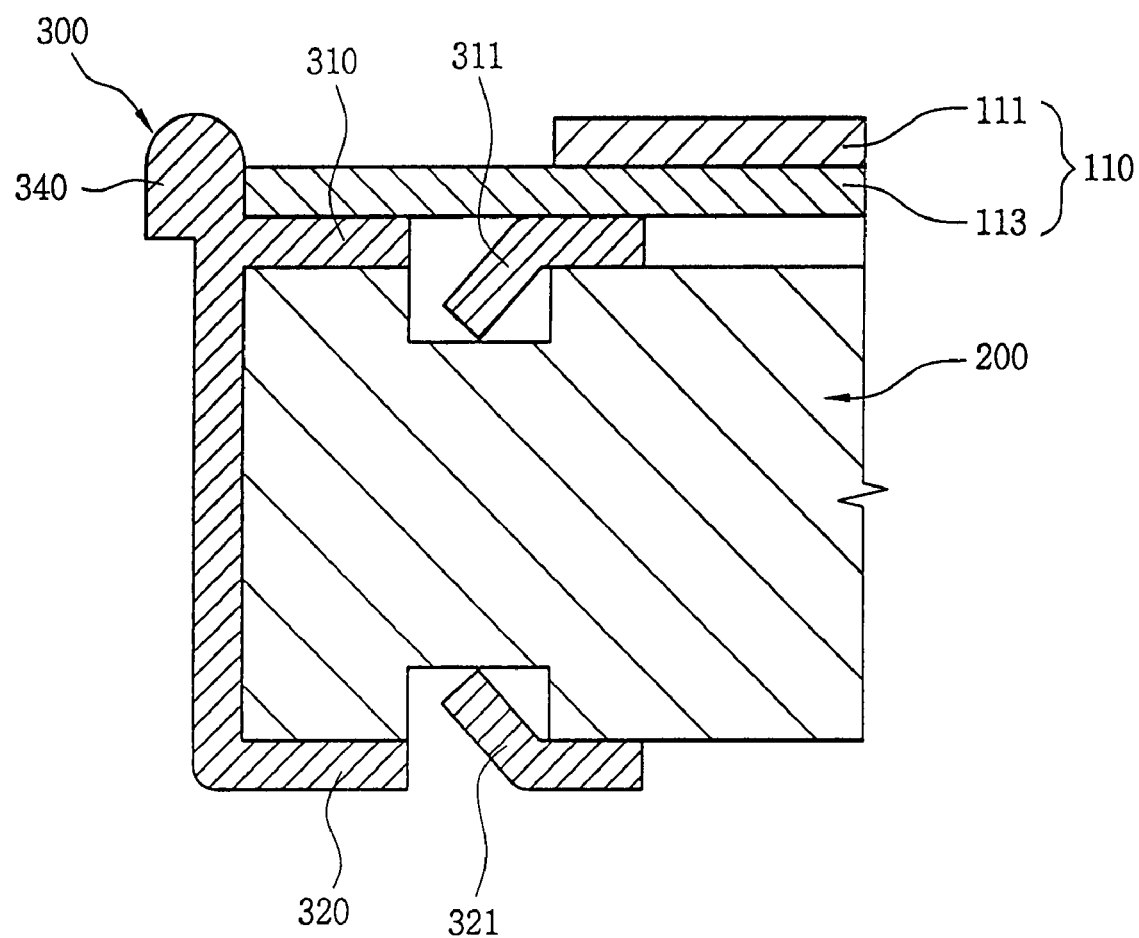
FIG. 8 is a cross-sectional view taken along the lines C-C for showing an assembled structure of a metal clip, a mold frame and an LCD panel shown in FIG. 7.

FIG. 7 is a perspective view showing a metal clip, a mold frame and an LCD panel shown in FIG. 1. FIG. 8 is a cross-sectional view taken along the lines C-C' for showing an assembled structure of a metal clip, a mold frame and an LCD panel shown in FIG. 7.

Referring to FIGS. 7 and 8, the LCD panel 110 having the first substrate 111 and the second substrate 113 facing the first substrate 111 is disposed on the mold frame 200 to which the metal clip 300 is coupled. Particularly, the LCD panel 110 is disposed on the upper surface 221 of the first sidewall 220 of the mold frame 200 and the upper surface of the first coupling portion 310 of the metal clip 300. When the LCD panel 110 is disposed on the first sidewall 220 and the first coupling portion 310, an end of the first substrate 111 is supported by means of the metal clip 300 because the first substrate 111 is larger than the second substrate 113. Accordingly, the metal clip 300 can support the LCD panel 110 so that the LCD panel is fixedly attached on the mold frame 200.

As shown in FIGS. 4 and 5, the mold frame 200 includes a stepped portion 253, on which the LCD panel 110 is disposed, formed on the third sidewall 250 thereof by partially cutting off an upper surface 251 of the mold frame 200. The LCD panel 110 is also supported by means of the third sidewall 250 upwardly extended from the stepped portion 253. The third sidewall 250 has a thickness at the upper surface 251 thicker than the first thickness t1 of the guiding portion 340 of the metal clip 300.

The mold frame 200 has the strength weaker than the strength of the metal clip 300 because the mold frame 200 comprises a plastic material. However, since the metal clip 300 coupled to the first sidewall 220 can improve the strength of the mold frame 200, the thickness of the mold frame 200 may be thinned and an entire size of the LCD apparatus 500 may be reduced.

Referring to FIGS. 7 and 8, the metal clip 300 is coupled to the first sidewall 220 on which the TCPs 130 (see FIG. 1) is disposed. The thickness of the first 10 sidewall 220 may cause deterioration of assemblability between the TCPs 130 and the mold frame 200. In order to prevent deterioration of assemblability between the TCPs 130 and the mold frame 200, the metal clip 300 is coupled to the area between the TCPs 130, on which the TCPs 130 are not disposed. Accordingly, the metal clip 300 can support the LCD panel 110 and does not affect the assemblability of the TCPs 130, thereby improving assemblability of the LCD apparatus 500.

In FIGS. 4 and 5, the metal clip 300 coupled to only the first sidewall 220 has been described. However, the metal clip 300 may be coupled to the second to fourth sidewalls 230, 240 and 250 of the mold frame 200.

Figure 9:
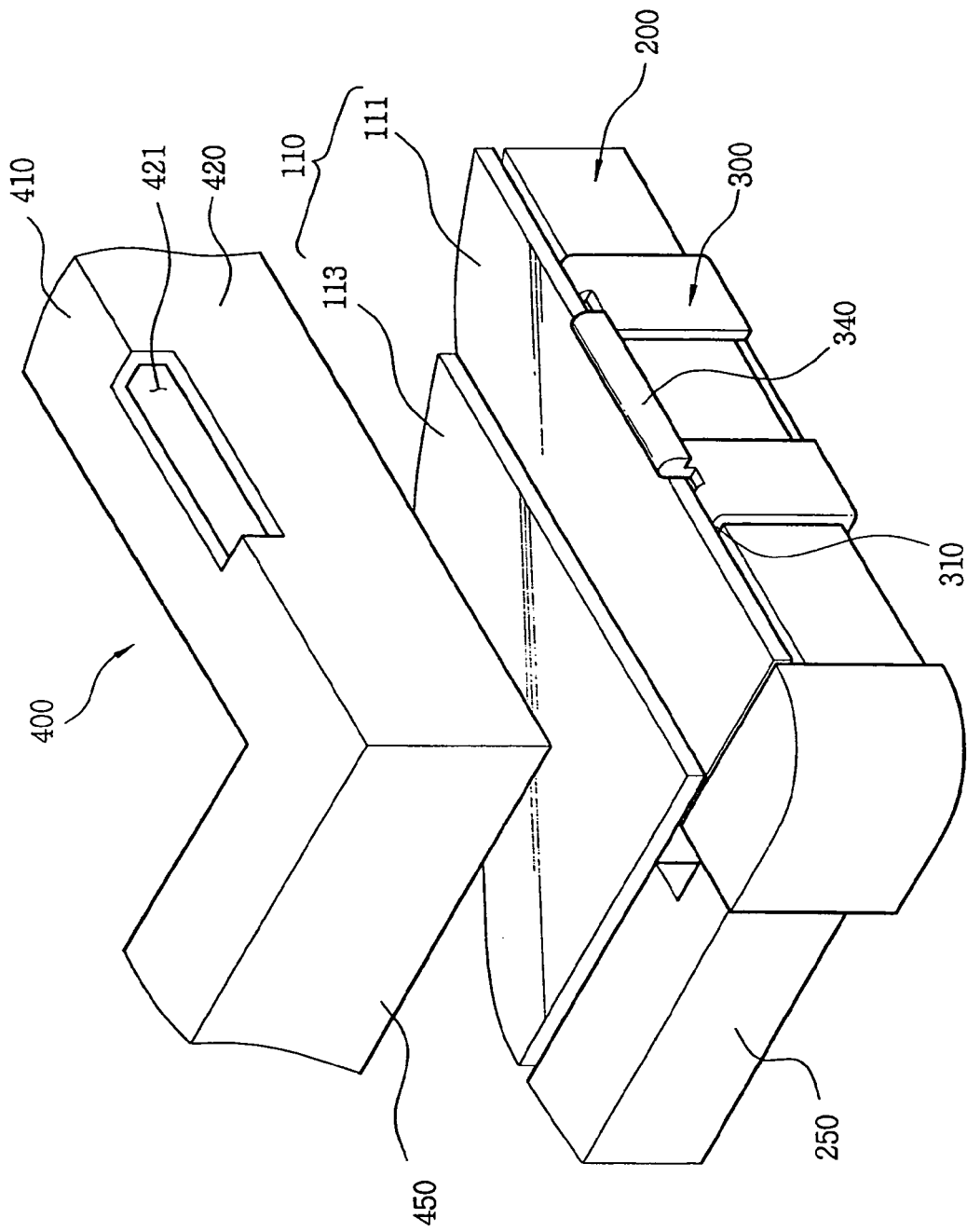
FIGS. 9 and 10 are perspective views showing a metal clip, a mold frame, an LCD panel and a top chassis shown in FIG. 1.
Figure 10:
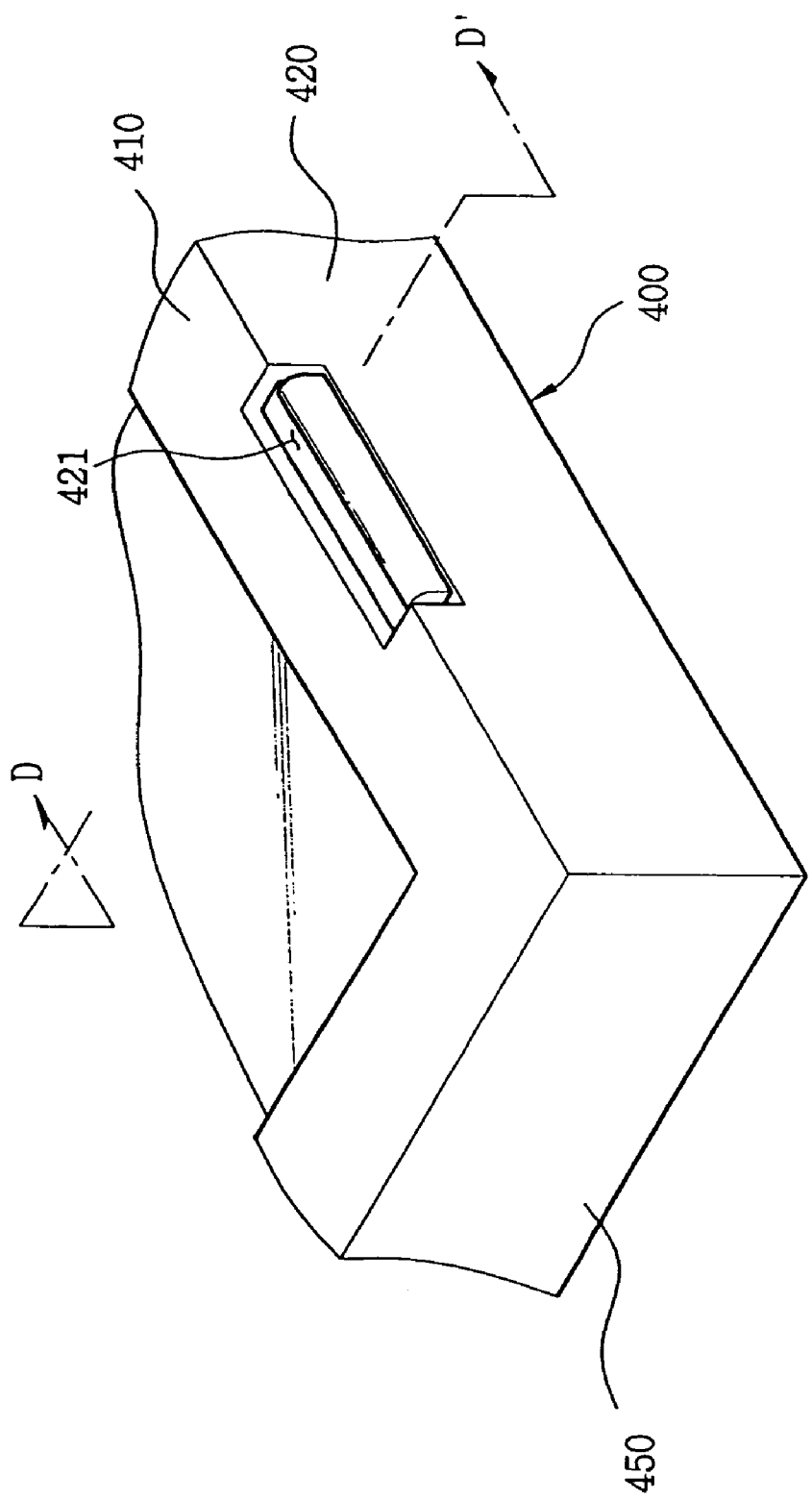
Figure 11:
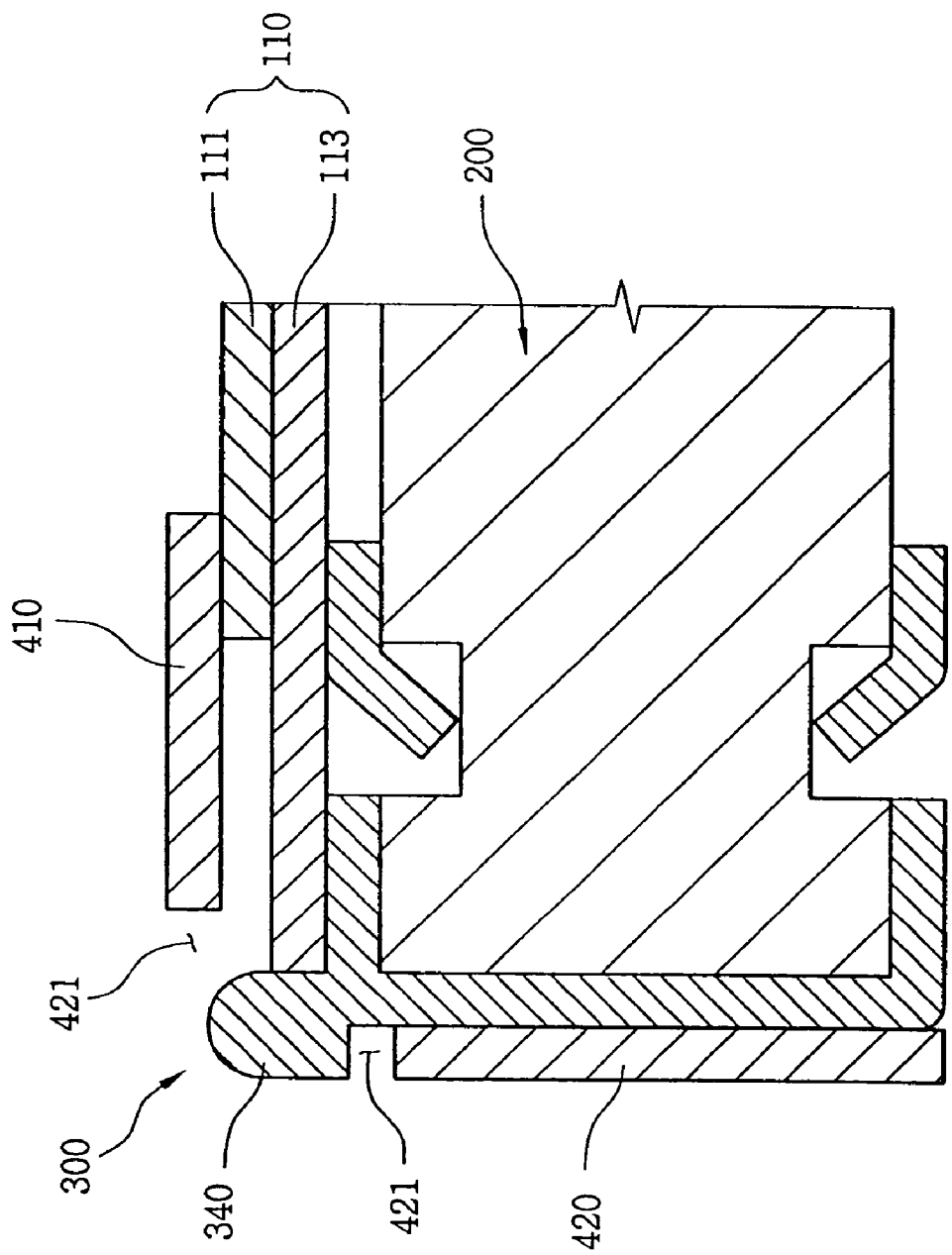
FIG. 11 is a cross-sectional view taken along the lines D-D' for showing an assembled structure a metal clip, a mold frame, an LCD panel and a top chassis shown in FIG. 10.

FIGS. 9 and 10 are perspective views showing a metal clip, a mold frame, an LCD panel and a top chassis shown in FIG. 1. FIG. 11 is a cross-sectional view taken along the lines D-D' for showing an assembled structure a metal clip, a mold frame, an LCD panel and a top chassis shown in FIG. 10.

Referring to FIGS. 9 to 11, the top chassis 400 is combined with the mold frame 200 on which the LCD panel 110 is disposed. Particularly, when the top chassis 400 is combined with the mold frame 200, the upper surface 410 of the top chassis 400 covers the peripheral area of the LCD panel 110. The fifth and seventh sidewalls 420 and 450 extended from the upper surface 410 of the top chassis 400 are combined with the first and third sidewalls 220 and 250 of the mold frame 220, respectively.

However, since the guide portion 340 of the metal clip 300 is upwardly 5 protruded from the first coupling portion 310, the fifth sidewall 420 may be abnormally combined with the first sidewall 220 when the top chassis 400 is combined with the mold frame 200. Thus, the guiding portion 340 has the round shape so as to prevent the fifth sidewall 420 from being abnormally combined with the guiding portion 340 when the top chassis 400 is combined with the mold frame 200.

The top chassis 400 is provided with a receiving hole 421 positioned at an edge portion where the upper surface 410 thereof meets the fifth sidewall 420 thereof and extended from the upper surface 410 to the fifth sidewall 420. When the top chassis 400 is combined with the mold frame 200, the guiding portion 340 of the 15 metal clip 300 is inserted into the receiving hole 421 of the top chassis 400, thereby preventing increase of the entire size of the LCD apparatus 500.

Figure 12:
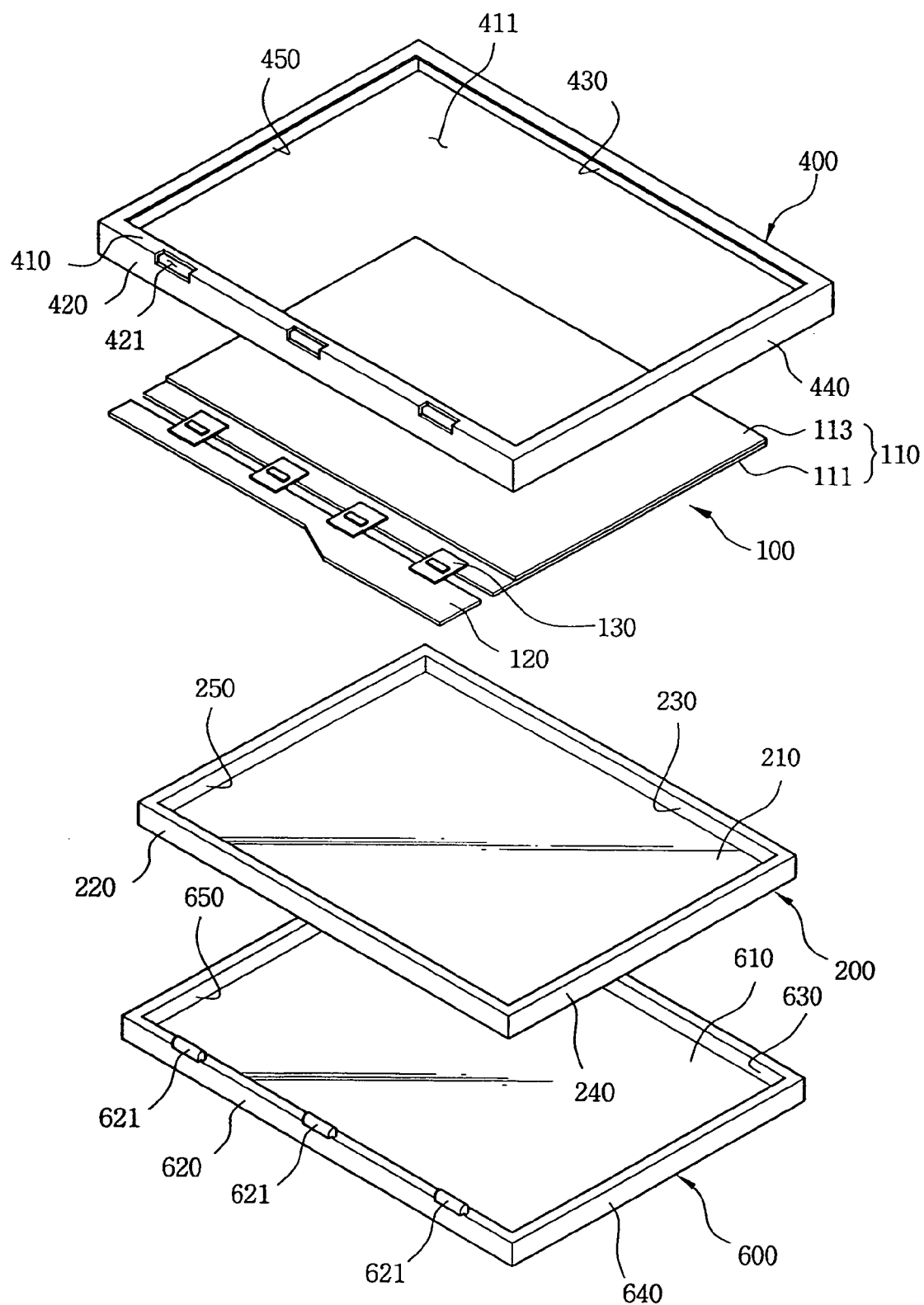
FIG. 12 is an exploded perspective view showing an LCD apparatus according to another exemplary embodiment of the present invention.
Figure 13:
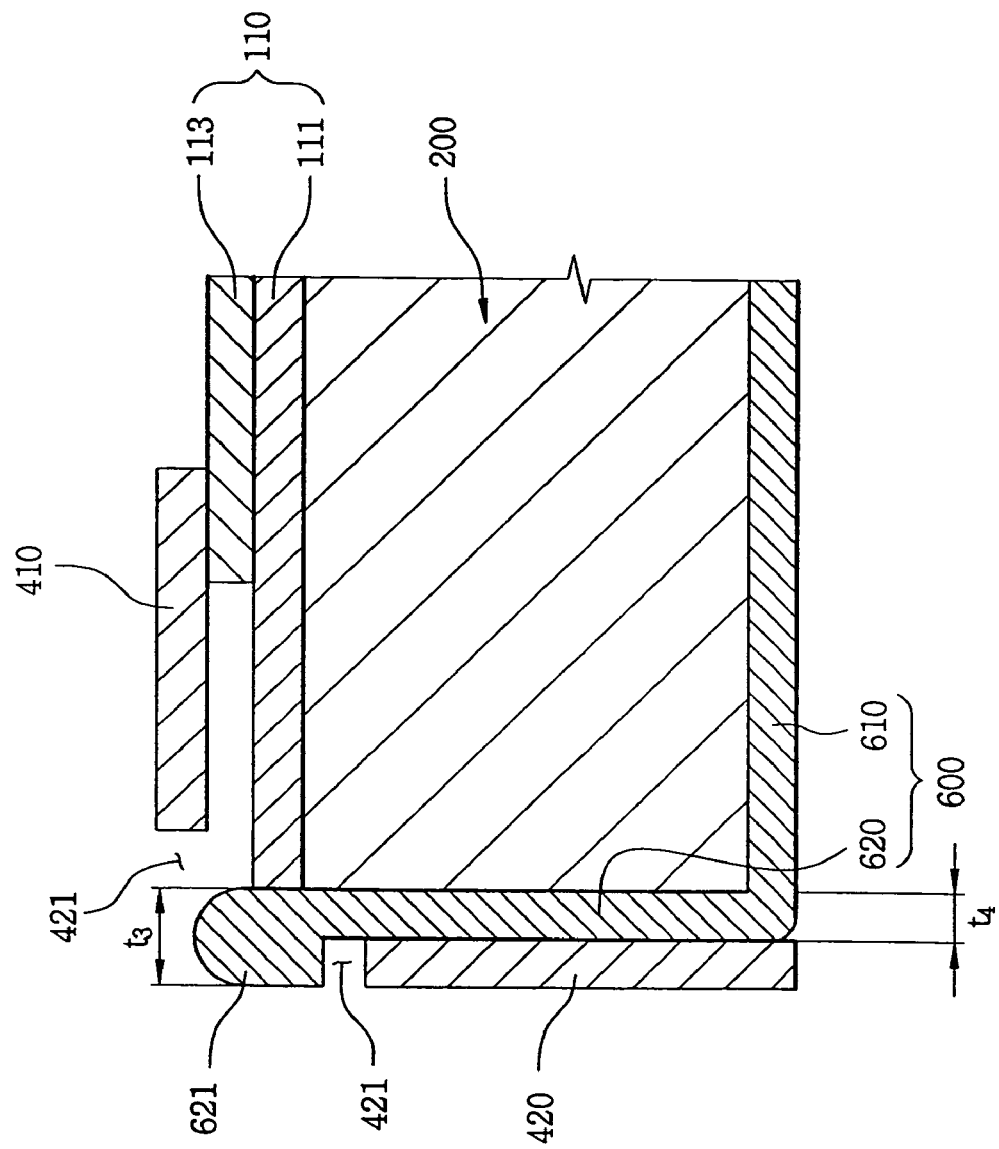
FIG. 13 is a cross-sectional view showing an assembled structure of an LCD apparatus shown in FIG. 12.

FIG. 12 is an exploded perspective view showing an LCD apparatus according to another exemplary embodiment of the present invention, and FIG. 13 is a cross-sectional view showing an assembled structure of an LCD apparatus shown in FIG. 12. In FIGS. 12 and 13, parts having the same structure and function as in those of the LCD apparatus 500 shown in FIG. 1 are represented as the same reference numerals as in those of the LCD apparatus 500 and a detailed description thereof will be omitted.

Referring to FIGS. 12 and 13, the LCD apparatus 700 according to another exemplary embodiment of the present invention includes a display unit 100 for displaying an image, a mold frame 200 for receiving the display unit 100, a bottom chassis 600 for receiving the mold frame 200 and guiding the display unit 100 and a top chassis 400 combined with the bottom chassis 600, for partially covering the display unit 100.

The mold frame 200 includes a bottom surface 210 and first to fourth sidewalls 220, 230, 240 and 250 extended from the bottom surface 210. The LCD panel 110 is disposed on the first to fourth sidewalls 220, 230, 240 and 250.

The bottom chassis 600 includes a supporting surface 610 and ninth to twelfth sidewalls 620, 630, 640 and 650 so as to receive the mold frame 200 on which the LCD panel 110 is disposed. The ninth sidewall 620 combined with the first sidewall 420 includes a guide portion 621 upwardly extended from an upper portion of the ninth sidewall 620. The guiding portion 621 is position at a position higher than the first sidewall 220 so as to support the LCD panel 110 disposed on the mold frame 200. The guiding portion 621 has a round shape at an upper portion thereof and a thickness t3 thicker than a thickness t4 of the ninth sidewall 620.

When the bottom chassis 600 receives the mold frame 200, the guiding portion 621 supports the LCD panel 110 disposed on the first sidewall 220 of the mold frame 200, thereby preventing the movement of the LCD panel 110.

Particularly, the LCD panel 110 includes a first substrate 111 and a second substrate 113 combined with the first substrate 111 and the first substrate 111 is larger than the second substrate 113. As shown in FIG. 13, the first substrate 111 makes contact with the guiding portion 621, so the guiding portion 621 can support the first substrate 111 and prevent the movement of the LCD panel 110.

The LCD panel 110 includes a display area on which an image is displayed and a peripheral area adjacent to the display area. The top chassis 400 includes an upper surface 410 formed with an opening 411 for exposing the display area of the LCD panel 110 and fifth to eighth sidewalls 420, 430, 440 and 450 extended from the upper surface 410 thereof. When the top chassis 400 is combined with the mold frame 200, the upper surface 410 of the top chassis 400 is disposed corresponding to the peripheral area and the fifth to eighth sidewalls 420, 430, 440 and 450 are combined with the ninth to twelfth sidewalls 620, 630, 640 and 650, respectively, so the peripheral area of the LCD panel 110 is covered by the upper surface 410 of the top chassis 400.

The top chassis 400 is provided with a receiving hole 421 positioned at an edge portion where the upper surface 410 thereof meets the fifth sidewall 420 and extended from the upper surface 410 to the fifth sidewall 420. The receiving hole 421 is formed at an area corresponding to the guiding portion 621 of the bottom chassis 600. When the top chassis 400 is combined with the bottom chassis 600, the guiding portion 621 of the bottom chassis 600 is inserted into the receiving hole 421 of the top chassis 400, thereby preventing increase of the entire size of the LCD apparatus 700.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A flat panel display device comprising:
    a display panel to display an image;
    a receiving receptacle having a first, second, third, and fourth sidewalls; and
    a guiding member having:
        a first coupling portion that is configured to fit between the display panel and the first sidewall,
        a second coupling portion that extends in a plane parallel to the first coupling portion,
        a connecting portion connecting the first coupling portion to the second coupling portion and making contact with the receiving receptacle, and
        a guiding portion that protrudes higher than the first coupling portion in a plane parallel to the connecting portion to prevent movement of the display panel.

2. The flat panel display device of claim 1, wherein the guiding member comprises a metal clip coupled to the first sidewall.

3. The flat panel display device of claim 1, wherein the second coupling portion is configured to be coupled to a lower portion of the first sidewall.

4. The flat panel display device of claim 1, wherein the guiding member comprises:
    a first protrusion inwardly protruding from the first coupling portion to the second coupling portion; and
    a second protrusion inwardly protruding from the second coupling portion to the first coupling portion.

5. The flat panel display device of claim 4, wherein the receiving receptacle is provided with a first fixing recess formed on an upper surface of the first sidewall and coupled to the first protrusion and a second fixing recess formed on a lower surface of the first sidewall and coupled to the second protrusion.

6. The flat panel display device of claim 3, wherein an upper edge of the guiding portion is rounded.

7. A flat panel display device comprising:
    a display panel to display an image;
    a first receptacle having a first, second, third, and fourth sidewalls, the first sidewall making contact with the first receptacle;
    a guiding member having a protrusion that extends substantially parallel to a plane of the first sidewall to guide the display panel disposed on the first sidewall; and
    a second receptacle having a supporting surface and a second sidewall extending from the supporting surface to receive the first receptacle.

8. The flat panel display device of claim 7, wherein the guiding member is integrally formed with the second receptacle.

9. The flat panel display device of claim 8, wherein the guiding member protrudes from the second sidewall of the second receptacle.

10. The flat panel display device of claim 9, wherein an upper edge of the guiding member is rounded.

* * * * *